United States Patent [19]

Kosaka et al.

[11] 3,896,069

[45] July 22, 1975

[54] HOT MELT COMPOSITION HAVING IMPROVED SOFTENING TEMPERATURE

[75] Inventors: Yujiro Kosaka; Hitoshi Kuroki; Nobuhiro Echida; Kanji Otomo; Masaru Uemura, all of Yokohama, Japan

[73] Assignee: Toyo Soda Manufacturing Co., Ltd., Japan

[22] Filed: May 28, 1974

[21] Appl. No.: 474,071

[30] Foreign Application Priority Data

May 26, 1973 Japan.................................. 48-58977

[52] U.S. Cl. 260/28.5 AV; 260/27 EV; 260/28.5 AS; 260/897 B
[51] Int. Cl............................................ C08c 11/70
[58] Field of Search . 260/897 B, 28.5 AV, 28.5 AS, 260/27 EV

[56] References Cited

UNITED STATES PATENTS

| | | | |
|---|---|---|---|
| 2,554,259 | 5/1951 | Mikeska et al. | 260/897 B |
| 2,950,267 | 8/1960 | Thompson et al. | 260/897 B |
| 3,256,365 | 6/1966 | Wolinski et al. | 260/897 B |
| 3,600,347 | 8/1971 | Godar, Jr. | 260/897 B |
| 3,639,189 | 2/1972 | Hartman | 260/897 B |

*Primary Examiner*—Melvyn I. Marquis
*Attorney, Agent, or Firm*—Oblon, Fisher, Spivak, McClelland & Maier

[57] ABSTRACT

A hot melt composition is prepared by employing an ethylene-vinyl-acetate copolymer, having a vinylacetate content of 10–45% by weight and melting index of 1 – 1,000 g/10 min., and admixing at least one tackifier, wax, or asphalt and an oxidized low molecular weight polypropylene in a ratio of 1/100 – 60/10 by weight with the ethylene-vinylacetate copolymer.

6 Claims, No Drawings

HOT MELT COMPOSITION HAVING IMPROVED SOFTENING TEMPERATURE

BACKGROUND OF THE INVENTION

1. Field of the Invention

This invention relates to a method of improving the softening temperature of a hot melt (heat melt) composition containing an ethylene-vinylacetate copolymer as a main component.

2. Description of the Prior Art

In general, conventional hot melt compositions have been prepared by blending mainly an ethylene-vinylacetate copolymer and at least one additive selected from the group of tackifiers, waxes or asphalts, and if desirable, rubbers, plasticizers, non-adhesive resins, pigments or fillers. The compositions are solid at room temperature and are used by melting and re-solidifying. Various hot melt type compositions have been prepared and may be classified as follows:

1. Hot melt adhesive compositions

The compositions are adhesives which are solid at room temperature and are applied in a heat molten condition. The compositions bond two substrates by cooling below the melting point. The hot melt adhesive compositions are prepared by blending, melting and mixing mainly ethylene-vinylacetate copolymer, for imparting adhesive and cohesive properties, with:

a tackifier, for improving adhesive properties and processability;

a wax, for decreasing viscosity in the melt condition and preventing blocking, and if desired a plasticizer, for imparting bendability;

a rubber;

an antioxidant, for preventing oxidation or deterioration at high temperature;

a pigment, for coloring;

or other additives.

The hot melt adhesive compositions can be used in various fields, such as a bookbinding, woodworking, plywood making, packaging, canning, shoe making, automatic processing, manufacture of paper articles, building, electrical parts, vehicle parts, or the like. The hot melt adhesive compositions are prepared by selecting a formulation which will achieve the desired adhesive property, melt viscosity, thermal stability, bendability, heat resistance, cold resistance, threadability and blocking property of the composition.

2. Hot melt coating compositions

The properties required in a hot melt coating depend upon the intended usage thereof, and include heat resistance, heat rolling ability, luster, moisture proofness, softness, antiblocking, transparency, and others. The compositions must have low viscosity in the melt condition since the compositions are applied in a molten condition onto a substrate. The hot melt coating compositions are usually composed of ethylene-vinylacetate copolymer and wax, and if desired, a tackifier for application in a field requiring tackiness and adhesiveness.

3. Others

The compositions composed of ethylene-vinylacetate and asphalt are used as coating compositions and adhesive compositions for outer surfaces of plastic pipe made of polyethylene, polyvinylchloride, ABS, etc., or metal pipe made of steel, copper, aluminum, etc.; and as lining agents or bonding agents for building materials; and as heat insulation for automobiles and buildings.

A tackifier can be added for imparting tackiness and adhesive properties, and a plasticizer, a rubber or a filler can also be added. The compositions composed of ethylene-vinylacetate copolymer, a tackifier, a pigment, a plasticizer and a filler can be used as a hot melt traffic paint for coating a colored composition onto the surface of roads, or as a hot melt paint.

The characteristics required for the hot melt compositions are high adhesion to substrate, softness in the solid state, and excellent heat resistance (high softening temperature) and cold resistance. However, the softening temperatures of hot melt compositions are usually lower than 100°C and thus are not high enough to prevent separation from the substrate in hot water or in other heated conditions. Also, it is necessary that the compositions have a low melt viscosity for ease of processing even though a high softening temperature is required.

In conventional hot melt compositions, in order to improve processability and wettability and to decrease the melt viscosity of the hot melt compositions, a main component comprised of ethylene-vinylacetate copolymer having a high melting index and high vinylacetate content has been used. Relatively large amounts of paraffin wax (melting point 150° – 220°F), coal wax (melting point 90° – 115°C), low molecular weight polyethylene wax (melting point 80° – 110°C), plasticizers, or the like have been added, that is the content of ethylene-vinylacetate copolymer is decreased. However, paraffin wax, coal wax, low molecular weight polyethylene waxes, etc., are hard and fragile and hot melt compositions containing these components are deficient in heat resistance (softening temperature), softness, adhesion and cold resistance. When a large amount of paraffin wax or plasticizer is added, the heat resistance (softening temperature) is even further decreased.

The tensile strength and melting point of ethylene-vinylacetate copolymer will decrease with increasing melting index and vinylacetate content. Accordingly, when a hot melt composition prepared by using the ethylene-vinylacetate copolymer having high melt index and high vinylacetate content, the adhesion (cohesion) and the heat resistance of the composition will decrease. When the content of ethylene-vinylacetate copolymer is decreased, the adhesion properties, softness and cold resistance of the composition will decrease.

As stated above, the adhesion, heat resistance (softening temperature) softness and cold resistance of the hot melt compositions will substantially decrease by decreasing the melt viscosity of the compositions as part of improving processability. In order to increase the heat resistance (softening temperature) of the hot melt compositions, ethylene-vinylacetate copolymer having a low content of vinylacetate, high melting point additives or fillers have been used. The heat resistance of the hot melt composition is increased by these operations, but the softness and the cold resistance are decreased and the melt viscosity is increased. It has thus been difficult to obtain a hot melt composition having a low melt viscosity, high adhesion, softness and cold resistance at the same time as high heat resistance (high softening temperature).

3

A need exists therefore for a hot melt composition which has high heat resistance, which can be achieved without sacrificing any of the other necessary properties.

SUMMARY OF THE INVENTION

Accordingly, one object of this invention is to provide a method of improving the heat resistance of hot melt compositions without deteriorating other important properties.

Another object of this invention is to provide hot melt compositions having an improved high softening temperature and low melt viscosity together with high adhesion, softness and cold resistance.

A further object of this invention is to provide hot melt compositions having a softening temperature greater than 100°C.

These and other objects as will hereinafter become more readily understood by the following description can be attained by blending into the composition a modifier prepared by oxidizing a low molecular weight polypropylene (500 – 10,000) having an acid value of 1 – 20 in a ratio of 1/100 – 60/10 by weight to the ethylene-vinylacetate copolymer.

DETAILED DESCRIPTION OF THE PREFERRED EMBODIMENTS

Suitable modifiers include those prepared by oxidizing a low molecular weight ethylene-propylene copolymer alone (500 – 10,000). The hot melt compositions of the invention contain the main component, an ethylene-vinylacetate copolymer having a melting index of 1 – 1000 g/10 min., and a vinylacetate content of 10 – 45 weight percent. The composition is solid at room temperature. In particular, the compositions of the basic components are composed of 1. 5 – 60 weight percent, preferably 10 – 40 weight percent of the ethylene-vinylacetate copolymer main component, and
2. at least one of the following: 10 – 70 weight percent, preferably 10 – 50 weight percent of a tackifier; 1 – 80 weight percent, preferably 20 – 70 weight percent of a wax; and 10 – 90 weight percent, preferably 40 – 90 weight percent of an asphalt; and
3. if desirable, one or more of the following: 1 – 20 weight percent, preferably 1 – 15 weight percent of a rubber; 1 – 20 weight percent preferably 1 – 15 weight percent of a plasticizer; 1 – 30 weight percent, preferably 1 – 20 weight percent of a nontacky resin; 1 – 60 weight percent, preferably 1 – 20 weight percent of a filler; and a pigment.

Preferable compositions are as follows:

| (1) | ethylene-vinylacetate | |
| | copolymer | 5 – 60 weight percent |
| | tackifier | 10 – 70 weight percent |
| | wax | 15 – 30 weight percent |
| (2) | ethylene-vinylacetate | |
| | copolymer | 25 – 60 weight percent |
| | tackifier | 20 – 70 weight percent |
| | filler | 5 – 50 weight percent |
| (3) | ethylene-vinylacetate | |
| | copolymer | 5 – 60 weight percent |
| | tackifier | 20 – 70 weight percent |
| | plasticizer | 5 – 15 weight percent |
| (4) | ethylene-vinylacetate | |
| | copolymer | 5 – 60 weight percent |
| | tackifier | 20 – 50 weight percent |
| | wax | 20 – 30 weight percent |
| | nontacky resin | 5 – 20 weight percent |
| (5) | ethylene-vinylacetate | |

-Continued
| | copolymer | 20 – 40 weight percent |
| | wax | 1 – 80 weight percent |

Compositions (1) and (2) are especially preferable.

Suitable tackifiers should be miscible with the ethylene-vinylacetate copolymer, natural products, derivatives of natural products and synthetic resins. Suitable natural products and their derivatives include compounds having polar groups, such as rosins, natural resins, terpenephenol resins; compounds having no polar groups, such as terpene resins; α-pinene or β-pinene-related terpene resins; dipentene resins, or the like. The rosin resins have as a main component abietic acid and abietic esters. Suitable rosins include gum rosins obtained from pine trees; wood rosins obtained by solvent extraction of the roots of pine trees; tall oil rosins obtained from pulp waste. Suitable rosins also include modified rosins, hydrogenated rosins, disproportionated rosins, polymerized rosins and the like. Suitable rosin derivatives include the polyol derivatives of rosins, hydrogenated rosins, polymerized rosins, disproportionated rosins, or the like. Suitable polyols include methanol, triethyleneglycol, diethyleneglycol, ethyleneglycol, glycerol, pentaerythritol, and others.

Suitable natural resins having a polar group include dammar, copal, shellac and terpenephenol. Natural resins having no polar group include terpene resins, α-pinene-related terpene resins, β-pinene-related terpene resins, and diterpene resins. The terpene resins can be obtained from turpentine. The terpenes are polymerized to resins of varying polymerization degree, molecular weight, distribution of molecular weight and copolymerization, which are in the form of viscous liquids or solids. Any terpene resin is suitable.

Suitable synthetic resin tackifiers (including hydrocarbon resins) include polymerized resins and polycondensed resins. The polymerized resins may be petroleum resins, coumarone-indene resins and styrene resins. The petroleum resins may be aliphatic petroleum resins, alicyclic petroleum resins, aromatic petroleum resins, or the like. The styrene-related resins can be styrene resins and substituted styrene resins. The suitable petroleum resins are prepared from thermally cracked residual oil and are solid at a room temperature. They impart tackiness and adhesion to the hot melt composition. Aliphatic petroleum resins can be prepared mainly by polymerization of $C_4$ and $C_5$ fractions which include butene, isobutylene, 1,3-pentadiene, cyclopentadiene or the like as main components. Aromatic petroleum resins are formed from fractions containing alkylstyrenes, e.g. α-methylstyrene, vinylstyrene; indene, alkylindene, or the like, as main components. Alicyclic petroleum resins can be prepared mainly by polymerization of $C_4$ and $C_5$ fractions.

The coumarone-indene polymerized resins are composed of a coumarone-indene main component of a residual oil. Various copolymers of coumarone-indene are also suitable. Coumarone-indene-styrene and related resins are commercially available. The polymerized styrene resins can be low molecular weight styrene resins, substituted styrene resins, styrene copolymers, or the like. Low molecular weight styrene resins, α-methylstyrene-vinyltoluene copolymer and related compounds are commercially available.

Suitable synthetic resin and polycondensed resin tackifiers include phenol resins, alkylphenol resins, rosin modified phenol resins, xylene resins, etc. Tackifiers suitable for use are resins which are solid at room temperature, are miscible with the ethylene-vinylacetate copolymer and having a melting point of 40° – 180°C.

Suitable waxes include animal wax, botanical (phyto) wax, mineral wax and synthetic wax. The animal wax can be bees wax, spermaceti wax, wool fat, shellac, or the like. The botanical wax can be carnuba wax, candelilla wax, esparto wax, ouricoury wax, etc.. The mineral wax can be natural wax, petroleum wax, and others. The petroleum wax can be paraffin wax, motor oil wax, micro wax. The synthetic wax can be polyethyleneglycol wax, blend terphenyl, halogenated hydrocarbons, Fisher-Tropsch polyethylene wax, hydrogenated wax, or the like. Petroleum wax is preferably used for the hot melt compositions, especially the hot melt coating compositions, and includes crystalline and microcrystalline wax. Suitable crystalline waxes include 100 paraffin to 145 paraffin as classified by melting point in the Japanese Industrial Standard K-2235-1961. The 135 paraffin and 145 paraffins are used mainly for hot melt coating, and they have good miscibility with ethylene-vinylacetate copolymer. The microcrystalline waxes are classified in grades having melting points higher than 155°F, higher than 165°F, 170° – 175°F, 180° – 190°F, 190° – 197°F and 197° – 220°F, by ASTM. The grade having melting points of 170° – 175°F is preferable. The waxes used in this invention having melting points of 100° – 300°F and contain mostly $C_9$ — $C_{60}$ compounds, preferably $C_{21}$ — $C_{35}$ compounds. The wax is blended with the ethylene-vinylacetate copolymer, and if necessary, with a tackifier to impart tackiness, and a desirable other component. The composition is then coated onto a substrate.

The coated products should have excellent antiblocking properties, luster, moisture permeability, flexibility, as well as excellent heat resistance, cold resistance, and adhesion to substrate. The heat resistance, cold resistance and adhesion to substrate are indispensable.

Suitable asphalts include blown asphalt, strate asphalt, or the like having softening points of 40° – 130°C, measured by the method of Japanese Industrial Standard K-2531-60, and needle penetration values less than 100, measured by the Japanese Industrial Standard K-2530-60 method. The composition of the asphalt and ethylene-vinylacetate copolymer plus any other necessary component is solid.

Pigments are added to make hot melt adhesive compositions, hot melt coating compositions, traffic paints, hot melt paints or the like. Most pigments, such as inorganic pigments used in conventional traffic paints and hot melt paints are suitable. Suitable pigments include titanium oxide, zinc sulfide, lithopone, basic lead sulfate, basic lead carbonate (white lead), zinc oxide, as white pigments; carbon black and iron black as black pigments; cadmium red, vermilion, molybdenum red, red lead as red pigments; red oxide, amber, sienna as brown pigments; yellow lead, cadmium yellow, zinc yellow, ocker as yellow pigments; chromium green, chromium oxide, zinc green as green pigments; ultramarine. Berlin blue, cobalt blue as blue pigments; and cobalt violet, manganese violet as violet pigments.

The fillers are dispersed in the hot melt composition, and impart antiblocking, threading and other properties. Fillers used in conventional hot melt compositions, traffic paints, and hot melt paints are suitable, and include barium sulfate, calcium carbonate, magnesium carbonate, titanium oxide, hydrated silica and magnesium oxide, which have a density of about 1.0 – 5.0.

Rubber is added to the hot melt composition mainly to impart high cold resistance and antisoftness. Suitable rubbers include polyisobutylene, butyl rubber, styrene-butadiene rubber, acrylonitrile-butadiene rubber, [2-chlorobutadiene-1, 3 polymer] chloroprene rubber, polybutadiene, ethylenepropylene rubber, or the like. The rubber is added to the extent of 0.5 – 20 weight percent to the hot melt type composition.

Plasticizers are added to the hot melt composition mainly to impart flexibility, and suitably include phthalic esters, such as 2-ethylhexyl phthalate, dimethylphthalate, diethylphthalate, dibutylphthalate, diheptyl phthalate, 2-diisooctyl phthalate, di-n-octyl phthalate, 2-dinoyl phthalate, diisodecyl phthalate, ditridecyl phthalate, dicyclohexylphthalate, dilauryl phthalate, or the like; dibasic aliphatic acid esters, such as dioctyl adipate, diisodecyl adipate or the like; aliphatic acid esters such as butyl oleate, methyl acetyl ricinolate, or the like; phosphoric acid esters, such as tricresyl phosphate, trioctyl phosphate, triphenyl phosphate, or the like; polymers, e.g. polyesters; paraffin, e.g. chlorinated paraffin; trioctyl trimellitate, and others. The plasticizer is preferably added in amounts less than 40 weight percent to the hot melt composition to maintain miscibility with the other components and prevent blooming.

Other polymers may be added to impart suitable characteristics, such as improved tensile strength, mechanical property, or the like, which may be desired depending upon the applications. Suitable polymers include atactic polypropylene, polyethylene, ethylene-organic acid copolymer, oxidized polyethylene, low molecular weight ethylene-vinylacetate copolymer, and others.

Suitable hot melt compositions of this invention include hot melt adhesive compositions, hot melt coating compositions, asphalt blends, traffic paints and hot melt paints, which are prepared by blending the above components depending upon the application. The components are heated and mixed to prepare the compositions. A tank equipped with a stirrer is preferably used as means for heating, melting and mixing, but any type of apparatus, which can heat and mix the contents, can be used. An Intensive mixer, Banbury mixer, of Super mixer is preferable.

To prepare the hot melt composition in the form of a pellet, rod or thread, the composition is heat-melted, mixed in an extruder equipped with a screw, extruded into a mold and cooled to form the desired shape. The operation of heating, melting and mixing is preferably preformed under atmospheric pressure but may be performed under high pressure or reduced pressure. The temperature for heating, melting and mixing is dependent on the component having the highest melting point, and is usually in the range of 70° – 300°C, preferably 90° – 200°C.

In the preparation of the hot melt composition by the process of this invention, the heat resistance (softening temperature) of the composition can be improved by adding an oxidized low molecular weight polypropylene having an acid value of 1 – 20 per molecule, in a ratio of 1/100 to 60/10 times by weight to the ethylene-vinylacetate copolymer. The oxidized low molecular weight polypropylene is prepared by oxidizing low molecular weight polypropylene (500 – 10,000) with oxygen or an oxygen-containing gas. The low molecular weight polypropylene itself may be prepared by telomerization of the olefin or thermal cracking of high molecular weight polypropylene, which is effective technologically and economically. In the thermal cracking of high molecular weight polypropylene, the polypropylene is heated to a temperature higher than 300°C in an inert gas or in a steam saturated inert gas, such as nitrogen, carbon dioxide, argon or the like. The low molecular weight ethylene-propylene copolymer which is obtained as a by-product may be used as the low molecular weight polypropylene.

The low molecular weight polypropylene having an average molecular weight of 500 – 10,000 (measured by the intrinsic viscosity method), which is obtained by the above procedure, is oxidized with oxygen or an oxygen-containing gas. The oxidized low molelcular weight polypropylene having an excellent color may also be molecular by supplying steam to the oxidation step. The oxidized low molecular weight polypropylene has an average molecular weight (measured by intrinsic viscosity) of 500 – 10,000 and has an acid value of 1 – 20 per molecule.

In accordance with this invention, the heat resistance of the resulting composition is improved to give softening temperatures (measured by ring-ball method) of higher than 100°C and melt viscosities at 160°C (measured by Brookfield viscometer) of about 6000 cps. The melt viscosity of conventional hot melt compositions at 180°C is more than 10,000 cps.

Having generally described the invention, a further understanding can be obtained by reference to certain specific examples which are provided herein for purposes of illustration only and are not intended to be limiting in any manner.

EXAMPLES

The following components (weight %) were heat-melted and mixed at 120° – 200°C for 1 – 2 hours, and the physical properties of the resulting hot melt composition were tested. In the Examples, the following abbreviations are used.

| | |
|---|---|
| EVA | ethylene-vinylacetate copolymer |
| VA | vinylacetate |
| MI | melting index |
| MW | molecular weight (measured by intrinsic viscosity) |

EXAMPLE 1

| | |
|---|---|
| EVA (VC content 28%, MI 400) | 40% |
| Glycerine ester of hydrogenated rosin (R and B softening temperature 72°C) | 40% |
| Oxidized low molecular weight polypropylene (MW 3500 Acid value 5) | 20% |

Properties of the composition

| | |
|---|---|
| R and B softening temperature | 126°C |
| Melt viscosity (160°C) | 3300 cps |
| Peel strength (Al/Al) | 9.5 kg./25 mm |
| Tensile strength | 16.0 kg/cm |
| Elongation | 1500% |
| Hardness (Shore-A) | 52 |
| Cold resistance | Good |
| Heat seal strength (OPP/OPP) | 2.5 kg/15 mm |

Note: Test methods (1) R and B softening temperature
Japanese Industrial Standard K 2531
(2) Melt viscosity
Brookfield viscometer
(3) Peel strength  90° peeling
Substrate:  25 mm width 0.1 mm thickness aluminum foil.
Structure:  Al foil/hot melt/Al foil comp. (0.2 mm thickness)
Peeling speed  150 mm/min.
(4) Tensile strength and Elongation
ASTM D 638-68
(5) Hardness:  ASTM D 2240-68
(6) Cold resistance:
A hot melt composition which was melted, was coated on a corrugated board and another corrugated board was plied onto the coated surface under pressure. The product was kept at –30°C for 3 hours and the product was peeled after warming to room temperature. When the corrugated board was broken, the cold resistance was good. When the coated surface was broken, the cold resistance was bad.
(7) Heat seal strength
The hot melt composition was coated on OPP in a thickness of 20μ and another OPP was plied onto the coated surface. The plies were heat-sealed at 80°C under a pressure of 1 kg/cm² for 1 second. The product was peeled at a peeling speed of 200 mm/min.

EXAMPLE 2

| | |
|---|---|
| EVA (VC content 19% MI 350) | 40% |
| Hydrogenated dicyclopentadiene resin (R and B softening temperature 123°C) | 20% |
| Oxidized low molecular weight polypropylene (MW 4900 acid value 15) | 40% |

| Properties of the Composition | |
|---|---|
| R and B softening temperature | 138°C |
| Melt viscosity (160°C) | 3800 cps |
| Peeling strength (Al/Al) | 3.5 kg/25 mm |
| Tensile strength | 36 kg/cm² |
| Elongation | 650% |
| Hardness (Shore - A) | 75 |
| Cold resistance | Good |

EXAMPLE 3

| | |
|---|---|
| EVA (VA content 28% MI 400) | 40% |
| Hydrated rosin (R and B softening temperature) | 40% |
| Oxidized low molecular weight polypropylene (MW 4000 acid value 3.5) | 20% |

| Properties of the Composition | |
|---|---|
| R and B softening temperature | 125°C |
| Melt viscosity (160°C) | 2900 cps |
| Peeling strength (Al/Al) | 9.5 kg/25mm |
| Tensile strength | 14 kg/cm² |
| Elongation | 1700% |
| Hardness (Shore - A) | 51 |
| Cold resistance | Good |
| Heat seal strength | 3.0 kg/15 mm |

As a reference, the low molecular weight polyethylene (MW 1500, R and B 102°C) was substituted for the oxidized low molecular weight polypropylene.

The properties of the hot melt compositions were as follows: The heat resistance, adhesiveness, softness and cold resistance of the compositions were quite inferior to those of the former composition.

| | |
|---|---|
| R and B softening temperature | 86°C |
| Melt viscosity | 2800 cps |
| Peel strength | 1.5 kg/25 mm |
| Tensile strength | 20 kg/cm$^2$ |
| Elongation | 350% |
| Hardness (Shore - A) | 79 |
| Cold resistance | Bad |
| Heat seal strength (OPP/OPP) | 0.2 kg/15 mm |

EXAMPLE 4

| | |
|---|---|
| EVA (VA content 28% MI 400) | 40% |
| Cyclopentadiene resin | 30% |
| Oxidized low molecular weight polypropylene (MW 2000 Acid value) | 30% |
| R and B softening temperature | 128°C |
| Melt viscosity | 3400 cps |
| Peel strength (Al/Al) | 2.5 kg/25 mm |
| Cold resistance | Good |

EXAMPLE 5

| | |
|---|---|
| EVA (VA content 28%, MI 400) | 40% |
| Polymerized rosin | 20% |
| Oxidized low molecular weight polypropylene (MW 2000 Acid value 3.5) | 40% |
| R and B softening temperature | 132°C |
| Melt viscosity | 4500 cps |
| Peel strength (Al/Al) | 2.1 kg/25 mm |
| Elongation | 340% |

EXAMPLE 6

| | |
|---|---|
| EVA (VA content 27%, MI 150) | 20% |
| Wax (softening temperature 145°F) | 60% |
| Oxidized low molecular weight polypropylene (MW 2000 Acid value 3.5) | 20% |
| R and B softening | 110°C |
| Melt viscosity (160°C) | 750 cps |
| Peel strength (Al/Al) | 1.0 kg/25 mm |
| Moisture permeability | 2.5 g/m$^2$·24Hr |

As a reference, the properties of the composition of EVA (no oxidized low molecular weight polypropylene) were tested. The cold resistance, moisture permeability and peel strength of the composition were inferior.

| | |
|---|---|
| EVA (VA content 27% MI 150) | 30% |
| Wax (softening temperature 145°F) | 70% |
| R and B softening temperature | 70°C |
| Melt viscosity (120°C) | 640 cps |
| Peel strength (Al/Al) | 120 g/25 mm |
| Moisture permeability | 9 g/m$^2$·24 Hr. |

Having now fully described the invention, it will be apparent to one of ordinary skill in the art that many changes and modifications can be made thereto without departing from the spirit or scope of the invention as set forth herein.

What is claimed as new and intended to be covered by Letters Patents is:

1. In a hot melt composition which comprises an ethylene-vinylacetate copolymer having a vinylacetate content of 10 – 45 weight percent and melting index of 1 – 1000 g/10 min. and at least one additive selected from the group consisting of a tackifier, wax and asphalt, the improvement which comprises:

admixing an oxidized low molecular weight polypropylene having an acid value of 1 – 20, which is prepared by oxidizing polypropylene having an average molecular weight of 500 – 10,000 in a ratio of 1/100 – 60/10 by weight with said ethylene-vinylacetate copolymer.

2. The hot melt composition of claim 1, which as a R and B softening temperature of greater than 100°C and a melt viscosity of less than 6000 cps at 160°C.

3. The hot melt composition of claim 1, wherein 5 – 60 weight percent of the ethylene-vinylacetate copolymer is employed, and at least one additive selected from the group consisting of 10 – 70 weight percent of said tackifier;
1 – 80 weight percent of said wax; and
10 – 90 weight percent of said asphalt;

and the oxidized low molecular weight polypropylene are admixed in a ratio of 1/100 – 60/10 by weight with said ethylene-vinylacetate copolymer.

4. The hot melt composition of claim 1, wherein the tackifier is a rosin, modified rosin or petroleum resin.

5. The hot melt type composition of claim 1, wherein the wax is a crystalline wax or microcrystalline wax.

6. The hot melt composition of claim 1, wherein the oxidized low molecular weight polypropylene is an oxidized low molecular weight ethylene-propylene copolymer, wherein the ethylene component is 0 – 20% by weight.

* * * * *